United States Patent [19]
Merkle

[11] Patent Number: 5,170,679
[45] Date of Patent: Dec. 15, 1992

[54] AUTOMATIC TRANSMISSION FOR A MOTOR VEHICLE WITH AN OVERRUNNING CLUTCH AS A HILL SUPPORT

[75] Inventor: Hans Merkle, Stuttgart, Fed. Rep. of Germany

[73] Assignee: Mercedes-Benz AG, Fed. Rep. of Germany

[21] Appl. No.: 727,952

[22] Filed: Jul. 10, 1991

[30] Foreign Application Priority Data

Aug. 8, 1990 [DE] Fed. Rep. of Germany ....... 4025069

[51] Int. Cl.$^5$ .............................................. B60K 41/18
[52] U.S. Cl. ...................................... 74/866; 192/1.31; 192/1.35; 192/7
[58] Field of Search ................. 74/866; 192/1.31, 1.35, 192/7

[56] References Cited

U.S. PATENT DOCUMENTS

| | | | |
|---|---|---|---|
| 4,515,259 | 5/1985 | Ha | 192/1.35 |
| 4,644,826 | 2/1987 | Kubo et al. | 74/866 OR |
| 4,648,289 | 3/1987 | Kubo et al. | 74/866 OR |
| 4,650,046 | 3/1987 | Parsons | 192/1.31 |
| 4,666,021 | 5/1987 | Messersmith | 192/1.31 |
| 4,867,291 | 9/1989 | Holman et al. | 192/7 X |

Primary Examiner—Leslie A. Braun
Assistant Examiner—Daniel Wittels
Attorney, Agent, or Firm—Evenson, Wands, Edwards, Lenahan, & McKeown

[57] ABSTRACT

A transmission for a motor vehicle, having frictional shift elements, an overrunning clutch used as a hill support, and an automatic control of the working pressure of the shift elements to protect the functioning of the overrunning clutch.

3 Claims, 1 Drawing Sheet

AUTOMATIC TRANSMISSION FOR A MOTOR VEHICLE WITH AN OVERRUNNING CLUTCH AS A HILL SUPPORT

BACKGROUND AND SUMMARY OF THE INVENTION

The invention relates to a motor vehicle with an automatic transmission and an overrunning clutch used as a hill support. A motor vehicle of the generic type is described in terms of its basic mode of operation in German Offenlegungsschrift 2,003,977.

The object of the present invention is to ensure automatically the necessary non-positive connection in the automatic transmission by appropriate control of the working pressure applied to shift elements (clutches, brakes) working by frictional engagement, whenever hill support is to be employed.

This object is achieved advantageously according to the invention, in which the overrunning clutch can be arranged in a hydrodynamic torque converter, and can prevent the turbine from rotating backwards. To guarantee the hill-support torque required for a particular vehicle, the so-called shift plate receiving the hydraulic controls can be widened correspondingly. Since no simple signal is available to indicate when the hill support is required, the control is such that, below a measurable minimum vehicle speed (minimum value of the transmission output speed), the working pressure is raised sufficiently high that the desired hill support is guaranteed. So that the output of the following transmission parts does not also rotate in the opposite direction to the gear shift, the control members transmitting the torque by non-positive connection are excited to a correspondingly high degree.

These functions can, for example, be performed hydraulically. A first switch position "drive" or "neutral" is obtained by means of the conventional range selector slide. In a second switch, the working pressure corresponding to the torque can be compared with the pressure required for hill support. This is carried out in a valve slide. If the working pressure is lower than the pressure for hill support, a speed comparison is carried out in a third switch with regard to the output speed by means of a slide. If the speed is below no, the pressure is increased to the pressure for the hill support. The hill support is then automatically provided when it is required.

In electronic control, the current signal for the torque-dependent working pressure and the electrical speed signals go directly to electronic switches and from there to the proportional solenoid valve controlling the working pressure. All intermediate stages between purely hydraulic and fully electronic control are of course possible.

Other objects, advantages and novel features of the present invention will become apparent from the following detailed description of the invention when considered in conjunction with the accompanying drawings.

DETAILED DESCRIPTION OF THE DRAWINGS

Figure 1:
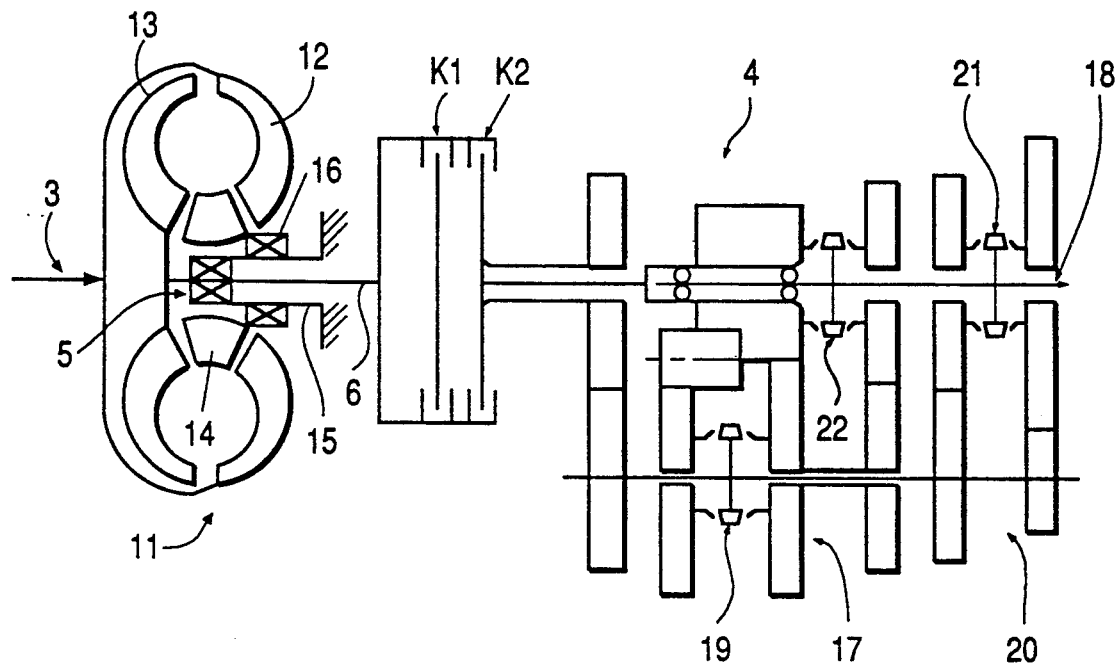
FIG. 1 is a schematic depiction of a two way transmission of the backgear type, with a hydrodynamic torque converter preceding in the force flux, and with an overrunning clutch used as a hill support.

Referring first to FIG. 1, in a motor vehicle (not shown) there are arranged in series in the force flux a driving engine 3 (indicated merely by its crankshaft), a hydrodynamic flow unit 11 in the form of a torque converter, two power-shift clutches K1 and K2 and a 2-way transmission 4 of the backgear type. In the torque converter 11, in the conventional way a pump impeller 12 is driven by the crankshaft 3, a turbine wheel 13 is connected essentially fixedly in terms of rotation to a turbine-wheel shaft 6 driving the power-shift clutches K1 and K2 on the input side and a guide wheel 14 is connected via an overrunning clutch 16 to a non-rotating stator shaft 15 fixed to the housing.

One power-shift clutch K1 is connected to a coaxial output shaft 18 via one part transmission 17 by means of synchronized gear-change shift clutches 19, 21 and 22, while the other power-shift clutch K2 is connected to the output shaft 18 via the second part transmission 20 by means of the gear-change shift clutch 21. The arrangement and functioning of this 2-way transmission 4 are known and are not the subject of the present invention.

Figure 2:
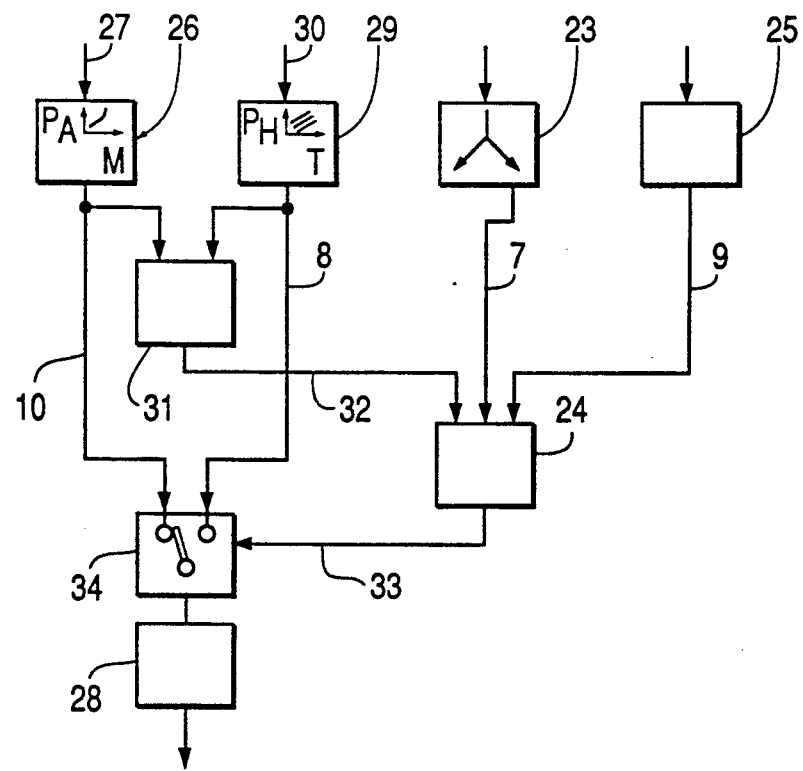
FIG. 2 is a block diagram of an automatic control of the working pressure of the two shift clutches of the gear-change transmission of FIG. 1, working by frictional connection.

To achieve the effect of a so-called hill support, the following arrangement is made:

The turbine-wheel shaft 6 is connected to the non-rotating stator shaft 15 by means of an overrunning clutch 5 which blocks the direction of rotation opposite to the direction of rotation of the crankshaft 3, while a control according to FIG. 2 is provided as follows for the working pressure $P_A$ of the power-shift clutches K1/K2:

When the conventional range selector lever of the automatic shift device of the transmission 4 is in a driving position, that is to say is in one of the conventional selector positions D, 3, 2, 1 or R, an electronic switch 23 triggers a signal 7 which is switched to one input of an AND element 24. When the speed of the output shaft 18 (that is, the transmission output speed $n_{Ab}$) falls to a value equal to or lower than a fixed minimum value $n_o$, an electronic comparator stage 25 triggers a signal 9 which is switched to a second input of the AND element 24. Function generator 26 receives an input signal 27 dependent on the engine load of the driving engine (crankshaft 3). The function generator 26 supplies a load dependent control signal 10 for an output stage 28 which controls an electromagnetic proportional valve for setting a working pressure $P_A$ dependent on the engine load. A second function generator 29 receives an input signal 30 dependent on a parameter of the particular vehicle type, for example its weight, in order to generate a control signal 8 for setting a holding pressure $P_H$, which is required for the purpose of subjecting the particular operative power-shift clutch K1 or K2 to the working pressure necessary to support the vehicle weight relative to the housing via the overrunning clutch 5. A comparator stage 31 receiving the control signals 8 and 10 via its two inputs emits an output signal 32 when the load-dependent working pressure $P_A$ is lower than the holding pressure $P_H$.

When all three control signals 7, 9 and 32 occur, AND element 24 generates a signal 33 which switches an electronic switch 34 so that the output stage 28 is from then on controlled by the control signal 8 for the holding pressure $P_H$ required for the particular vehicle.

This ensures that, in a driving position in which a power-shift clutch and a gear shift clutch are always engaged and at a driving speed approaching zero, the vehicle is automatically protected against "rolling back" because the power-shift clutch working by frictional connection is also positively subjected to working pressure at a sufficiently high degree.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. Automatic-shift gear-change transmission arrangement for a motor vehicle, having an engine and an overrunning clutch adapted to block one direction of a rotation of a transmission shaft of said automatic transmission, which transmission shaft has the same direction of rotation for both forward and reverse movement of said motor vehicle, said arrangement comprising:
    a plurality of pressure actuated frictional shift elements;
    said overrunning clutch being arranged between a transmission housing of said gear-change transmission and said transmission shaft, with the transmission shaft being connected with said overrunning clutch and arranged in a force flux between said engine and said shift elements;
    means for applying a working pressure to actuate said frictional shift elements;
    means for generating a first control signal dependent on a driving state of said gear-change transmission only when said gear-change transmission is in a driving position;
    means for generating a reference signal for selecting a holding pressure value, dependent on characteristics of said motor vehicle, for use as said working pressure;
    means for generating a speed dependent control signal when output speed of said transmission is less than or equal to a predetermined minimum value;
    means for generating a load-dependent control signal for selecting a pressure value, dependent on torque of said engine, for use as said working pressure; and
    control means, operative when at least both of said first control signal and said speed dependent control signal are present, for adjusting said working pressure at least to said holding pressure, and for maintaining said working pressure at least at said pressure selected in response to said load dependent control signal when the latter is greater than said holding pressure, whereby said working pressure is kept sufficient to support weight of said vehicle.

2. Apparatus according to claim 1, wherein said shift elements are frictional clutches.

3. Apparatus according to claim 1, wherein said arrangement further comprises means for comparing said load dependent control signal and said reference signal and for generating an output signal when said load dependent control signal is less than said reference signal, and wherein said control means is operative only when said output signal is present in addition to said first control signal and speed dependent control signal.

* * * * *